US012170425B2

(12) United States Patent
Yang et al.

(10) Patent No.: US 12,170,425 B2
(45) Date of Patent: Dec. 17, 2024

(54) CONNECTOR AND CONNECTOR ASSEMBLY

(71) Applicant: Tyco Electronics (Shanghai) Co. Ltd., Shanghai (CN)

(72) Inventors: Yuchen Yang, Shanghai (CN); Jianxiong Li, Shanghai (CN); Reicky Zhang, Shanghai (CN); Haomai Yin, Shanghai (CN); Xionghui Zheng, Suzhou (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 325 days.

(21) Appl. No.: 17/696,231

(22) Filed: Mar. 16, 2022

(65) Prior Publication Data

US 2022/0302649 A1 Sep. 22, 2022

(30) Foreign Application Priority Data

Mar. 19, 2021 (CN) ........................ 202120565228.0

(51) Int. Cl.

| | |
|---|---|
| ***H01R 13/645*** | (2006.01) |
| *H01R 13/52* | (2006.01) |
| *H01R 13/703* | (2006.01) |

(52) U.S. Cl.

CPC ....... *H01R 13/645* (2013.01); *H01R 13/5202* (2013.01); *H01R 13/703* (2013.01)

(58) Field of Classification Search

CPC .. H01R 13/6315; H01R 13/64; H01R 13/645; H01R 13/6456; H01R 13/5202; H01R 13/6581; H01R 13/703; H01R 12/91; H01R 12/7005

See application file for complete search history.

(56) References Cited

U.S. PATENT DOCUMENTS

| | | | | | |
|---|---|---|---|---|---|
| 4,229,064 | A * | 10/1980 | Vetter | H01R 13/6456 | 439/680 |
| 4,542,952 | A | 9/1985 | Tomsa | | |
| 4,764,129 | A * | 8/1988 | Jones | H01R 13/642 | 439/680 |
| 5,190,467 | A * | 3/1993 | Ohta | H01R 13/641 | 439/357 |
| 5,397,196 | A | 3/1995 | Boiret et al. | | |

(Continued)

FOREIGN PATENT DOCUMENTS

| | | |
|---|---|---|
| CN | 207021444 | 2/2018 |
| CN | 110581391 A | 12/2019 |

(Continued)

*Primary Examiner* — Thanh Tam T Le

(74) *Attorney, Agent, or Firm* — Potomac Law Group, PLLC

(57) ABSTRACT

The present invention discloses a connector and a connector assembly. The connector has a housing and a terminal position holder detachably mounted on an end of the housing. A mating feature adapted to mate with a corresponding mating connector is formed on the terminal position holder, so that the connector is adapted to mate with the corresponding mating connector. In the present invention, when it is necessary to change the identification feature on the connector, only the terminal position holder needs to be replaced without replacing the whole housing. Therefore, the cost is low and the use is very convenient.

13 Claims, 7 Drawing Sheets

(56) References Cited

U.S. PATENT DOCUMENTS

| | | | | |
|---|---|---|---|---|
| 5,662,488 | A | 9/1997 | Alden | |
| 5,729,644 | A * | 3/1998 | Shiflett | G02B 6/4246 385/59 |
| 5,902,155 | A * | 5/1999 | Polgar | H01R 13/518 439/701 |
| 6,383,032 | B1 * | 5/2002 | Gerberding | H01R 13/645 439/681 |
| 6,769,813 | B2 * | 8/2004 | Cheng | G02B 6/4292 385/78 |
| 7,258,493 | B2 * | 8/2007 | Milette | G02B 6/3831 439/680 |
| 7,347,742 | B2 | 3/2008 | Hall et al. | |
| 7,347,745 | B1 | 3/2008 | Raudenbush et al. | |
| 7,381,072 | B2 | 6/2008 | Nagano | |
| 7,674,046 | B2 * | 3/2010 | Milette | G02B 6/3831 385/75 |
| 7,909,658 | B2 * | 3/2011 | Pfaffenbach | H01R 13/6273 439/680 |
| 7,980,894 | B1 | 7/2011 | Hall et al. | |
| 8,011,942 | B2 | 9/2011 | Ohmori et al. | |
| 8,968,021 | B1 | 3/2015 | Kennedy et al. | |
| 9,437,961 | B1 | 9/2016 | Smajda | |
| 9,595,789 | B1 | 3/2017 | Ehrman et al. | |
| 9,680,256 | B1 | 6/2017 | Lane et al. | |
| 9,837,761 | B1 | 12/2017 | Hardy et al. | |
| 10,153,581 | B2 * | 12/2018 | Mitchell | H01R 31/06 |
| 10,256,574 | B2 | 4/2019 | Nishida et al. | |
| 10,355,406 | B2 | 7/2019 | Joniak et al. | |
| 10,557,621 | B2 * | 2/2020 | Gietl | H01R 13/64 |
| 10,594,069 | B2 * | 3/2020 | Kon | H01R 13/436 |
| 10,649,152 | B1 | 5/2020 | Yang | |
| 10,847,927 | B2 | 11/2020 | Maddens et al. | |
| 10,862,243 | B2 * | 12/2020 | Nishiyama | H01R 13/641 |
| 11,011,871 | B2 | 5/2021 | Fujiwara et al. | |
| 11,070,013 | B2 * | 7/2021 | Brandt | H01R 24/542 |
| 11,075,492 | B2 * | 7/2021 | You | H01R 24/76 |
| 11,108,192 | B2 * | 8/2021 | Tie | H01R 24/005 |
| 11,381,033 | B2 * | 7/2022 | Johnson | H01R 13/629 |
| 11,482,809 | B2 * | 10/2022 | Zebhauser | H01R 13/516 |
| 11,588,286 | B2 * | 2/2023 | Van Dommelen | H01R 13/64 |
| 11,594,838 | B2 * | 2/2023 | Little | H01R 13/64 |
| 11,705,660 | B2 * | 7/2023 | Reichel | H01R 13/6397 439/131 |
| 11,715,908 | B2 * | 8/2023 | Haynes | H01R 43/18 439/594 |
| 2004/0192099 | A1 | 9/2004 | Seminara et al. | |
| 2005/0208820 | A1 | 9/2005 | Sanuki | |
| 2007/0020986 | A1 | 1/2007 | Fry et al. | |
| 2007/0054535 | A1 | 3/2007 | Hall et al. | |
| 2007/0105417 | A1 | 5/2007 | Camelio | |
| 2009/0029584 | A1 | 1/2009 | Sami | |
| 2009/0191750 | A1 | 7/2009 | Kadar-Kallen et al. | |
| 2012/0190234 | A1 | 7/2012 | Montena et al. | |
| 2012/0238124 | A1 | 9/2012 | Zhao | |
| 2013/0137287 | A1 | 5/2013 | Grimm | |
| 2013/0209041 | A1 | 8/2013 | Szilagyi et al. | |
| 2016/0181721 | A1 | 6/2016 | Rauer | |
| 2017/0271815 | A1 | 9/2017 | Lane et al. | |
| 2018/0034202 | A1 | 2/2018 | Pierce-Jones | |
| 2018/0083397 | A1 | 3/2018 | Hall et al. | |
| 2018/0241154 | A1 | 8/2018 | Khorrami et al. | |
| 2019/0109408 | A1 | 4/2019 | Maddens et al. | |
| 2019/0148868 | A1 | 5/2019 | Pierce-Jones et al. | |
| 2019/0190200 | A1 | 6/2019 | Chang et al. | |
| 2020/0091661 | A1 | 3/2020 | Takahashi | |
| 2020/0119499 | A1 | 4/2020 | Leischner et al. | |
| 2020/0144758 | A1 | 5/2020 | Itou et al. | |
| 2020/0153159 | A1 | 5/2020 | Gartenmaier | |
| 2020/0212630 | A1 | 7/2020 | Qiu et al. | |
| 2020/0227861 | A1 | 7/2020 | Fujiwara et al. | |
| 2020/0325941 | A1 | 10/2020 | Nakamura et al. | |
| 2020/0398684 | A1 | 12/2020 | Motomiya et al. | |
| 2020/0412047 | A1 | 12/2020 | Becavin et al. | |
| 2022/0216651 | A1 | 7/2022 | Nishijima | |

FOREIGN PATENT DOCUMENTS

| | | | |
|---|---|---|---|
| DE | 102012104857 | A1 | 12/2013 |
| DE | 102013018160 | | 2/2015 |
| DE | 102015105832 | A1 | 10/2016 |
| DE | 102017112160 | A1 | 12/2018 |
| EP | 0849839 | A1 | 6/1998 |
| EP | 1154169 | A1 | 11/2001 |
| JP | 2002231375 | A | 8/2002 |
| JP | 2018045883 | A | 3/2018 |
| JP | 2018125078 | A | 8/2018 |
| JP | 2020187891 | A | 11/2020 |
| WO | 2007040013 | A1 | 4/2007 |
| WO | 2016166066 | A1 | 10/2016 |
| WO | 2020071119 | A1 | 4/2020 |
| WO | 2020230583 | A1 | 11/2020 |

* cited by examiner

CONNECTOR AND CONNECTOR ASSEMBLY

CROSS-REFERENCE TO RELATED APPLICATION

This application claims the benefit of Chinese Patent Application No. 202120565228.0 filed on Mar. 19, 2021 in the State Intellectual Property Office of China, the whole disclosure of which is incorporated herein by reference.

BACKGROUND OF THE INVENTION

Field of the Invention

The present invention relates to a connector and a connector assembly comprising the connector.

Description of the Related Art

In the prior art, in order to realize the rapid electrical connection between cables or between cable and electrical equipment, plug connector and socket connector suitable for rapid mating are usually adopted. Usually, the cable is pre installed on the plug connector and the socket connector is pre installed on the electrical equipment. When the plug connector and the socket connector are mated together, the electrical connection between the cable and the electrical equipment is realized.

In the prior art, different types or functions of electrical equipments, such as motors with different powers, need to use different types of cables. In order to identify and distinguish the electrical equipments, it is usually necessary to form identification features (or referred as codes) on the plug connector, the socket connector and the electrical equipment, so as to prevent the electrical equipment from being connected with a mismatched cable whose type is not correct.

However, in the prior art, the identification features are usually directly formed on the outer housings of the plug connector and the socket connector. Therefore, when it is necessary to change the identification features on the plug connector and the socket connector, the whole outer housings of the plug connector and the socket connector must be replaced, which has high cost and is very inconvenient to use.

SUMMARY OF THE INVENTION

The present invention has been made to overcome or alleviate at least one aspect of the above mentioned disadvantages.

According to an aspect of the present invention, there is provided a connector, comprising: a housing; and a terminal position holder detachably mounted on an end of the housing. A mating feature adapted to mate with a corresponding mating connector is formed on the terminal position holder, so that the connector is adapted to mate with the corresponding mating connector.

According to an exemplary embodiment of the present invention, the connector comprises a plurality of connectors, at least one of the shape, size, number and position of the mating features of the plurality of connectors is different.

According to another exemplary embodiment of the present invention, except for the mating feature, other features of the plurality of connectors are exactly the same.

According to another exemplary embodiment of the present invention, except for the terminal position holder, other parts of the plurality of connectors are identical and interchangeable.

According to another exemplary embodiment of the present invention, the terminal position holder is cylindrical and includes a cylindrical wall and an outer end wall at the outer end of the cylindrical wall; the outer end wall is formed with a terminal through hole to allow a terminal of the mating connector to be inserted.

According to another exemplary embodiment of the present invention, the terminal position holder has a positioning notch formed on the cylindrical wall, the housing has a protrusion package for installing a first detection connector, and the protrusion package is positioned in the positioning notch; the mating feature is a mating protrusion projecting radially outward from the outer surface of the cylindrical wall, and an area where the mating protrusion is located is opposite to the positioning notch in a radial direction of the cylindrical wall.

According to another exemplary embodiment of the present invention, an arc-shaped positioning protrusion is respectively formed on the outer surface of both sides in the horizontal direction of the cylindrical wall, and the arc-shaped positioning protrusions are opposite to each other in the radial direction of the cylindrical wall; the outer peripheral surfaces of the arc positioning protrusion, the mating feature and the protrusion package are adapted to contact an inner wall surface of an outer housing of the mating connector to position the connector.

According to another exemplary embodiment of the present invention, at least one opening is formed on the cylindrical wall of the terminal position holder, and a protrusion adapted to be snapped into the opening is formed on the housing of the connector.

According to another exemplary embodiment of the present invention, when the terminal position holder is mounted on the housing of the connector, the outer end wall of the terminal position holder rests against an end face of the housing of the connector.

According to another exemplary embodiment of the present invention, a positioning slot is formed on the outside of the outer end wall of the terminal position holder to mate with a positioning convex structure formed on the terminal of the mating connector.

According to another exemplary embodiment of the present invention, the positioning slot is communicated with the terminal through hole formed on the outer end wall of the terminal position holder.

According to another exemplary embodiment of the present invention, the connector further comprises a terminal fixedly installed in the housing.

According to another aspect of the present invention, there is provided a connector assembly comprising the above connector and a mating connector mated with the connector.

According to an exemplary embodiment of the present invention, the mating connector comprises an inner housing, the inner housing is provided with a first mating feature adapted to mate with a corresponding electrical equipment.

According to another exemplary embodiment of the present invention, the inner housing of the mating connector is also provided with a second mating feature adapted to mate with the mating feature of the connector.

In the above exemplary embodiments according to the present invention, when it is necessary to change the identification feature on the connector, only the terminal position holder needs to be replaced without replacing the whole housing. Therefore, the cost is low and the use is very convenient.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
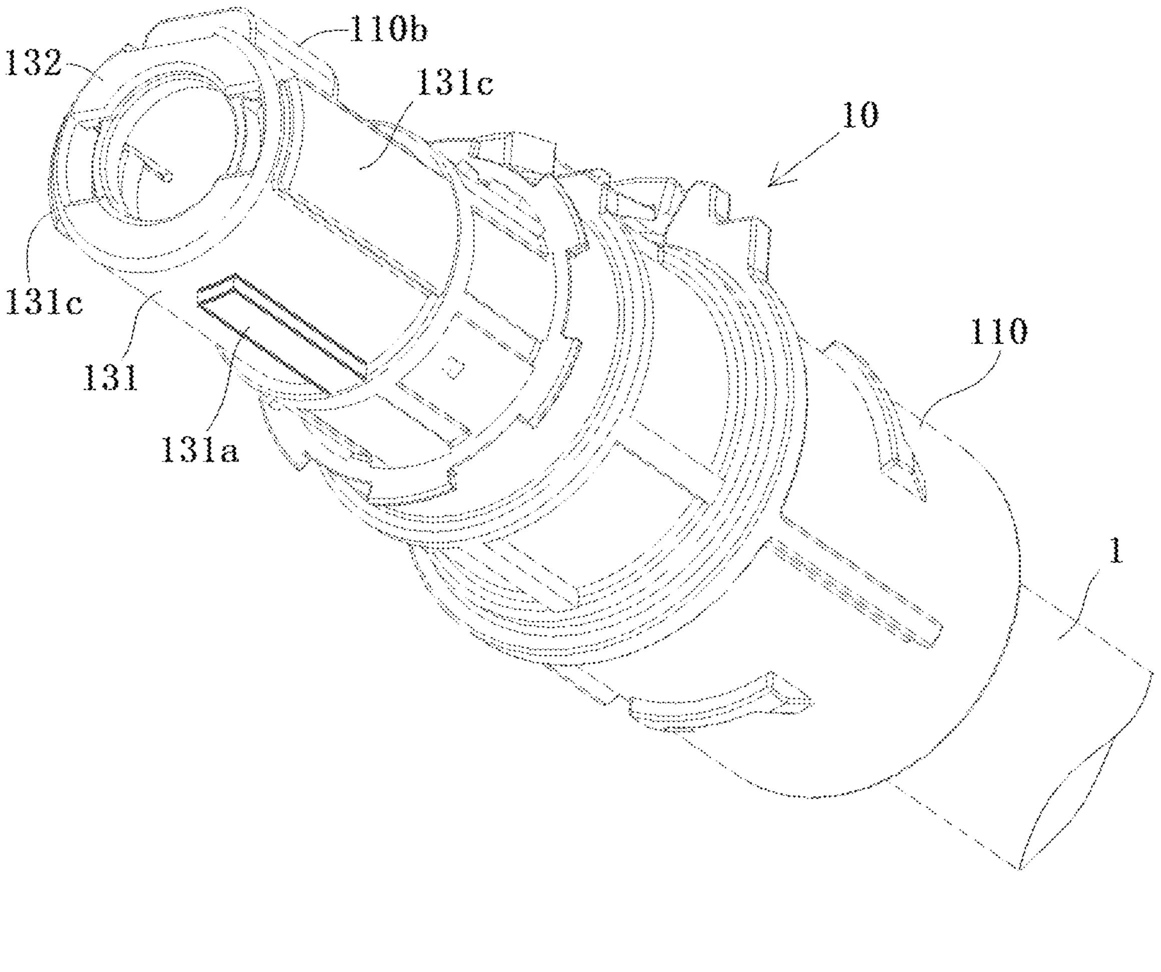
FIG. 1 shows a three-dimensional schematic diagram of a connector according to an exemplary embodiment of the present invention, wherein a terminal position holder is sleeved on the housing of the connector.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a connector, comprising: a housing; and a terminal position holder detachably mounted on an end of the housing. A mating feature adapted to mate with a corresponding mating connector is formed on the terminal position holder, so that the connector is adapted to mate with the corresponding mating connector.

Embodiment of Connector Assembly

Figure 5:
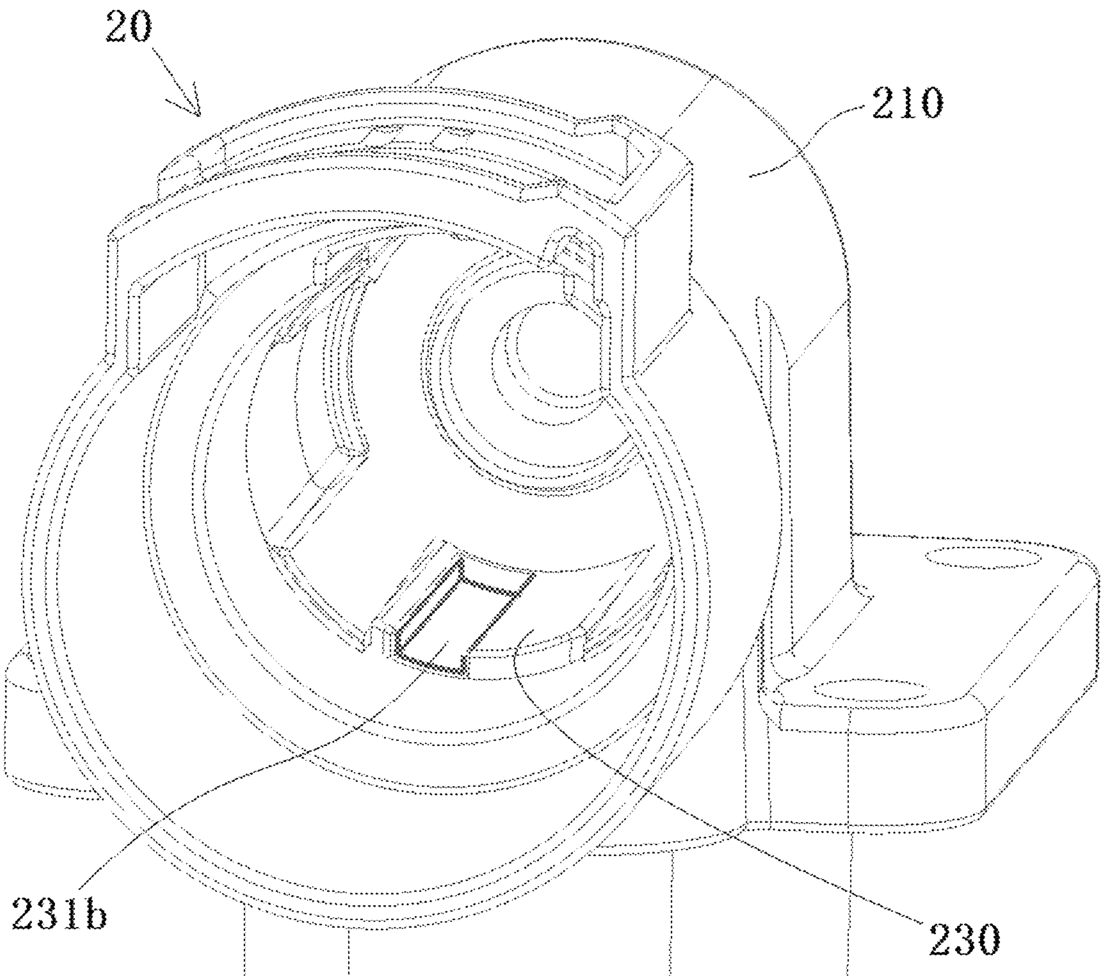
FIG. 5 shows a three-dimensional schematic diagram of a mating connector according to an exemplary embodiment of the present invention.

FIG. 1 shows a three-dimensional schematic diagram of a connector 10 according to an exemplary embodiment of the present invention; FIG. 5 shows a three-dimensional schematic diagram of a mating connector 20 according to an exemplary embodiment of the present invention.

As shown in FIGS. 1 and 5, in the illustrated embodiment, the connector assembly mainly includes a connector 10 and a mating connector 20. The mating connector 20 is suitable for mating with the connector 10. In the illustrated embodiment, the connector 10 is connected to one end of the cable 1. The mating connector 20 is mounted to electrical equipment (not shown, for example, a motor). When the connector 10 is mated with the mating connector 20, the electrical connection between the cable 1 and the electrical equipment can be realized, so that the electrical equipment can be supplied with power through the cable 1.

In the embodiments shown in FIGS. 1 and 5, the connector 10 may be a plug connector and the mating connector 20 may be a socket connector.

Some embodiments of the aforementioned mating connector 20 and the connector 10 will be described in detail below with reference to the accompanying drawings.

Embodiment of Connector

Figure 2:
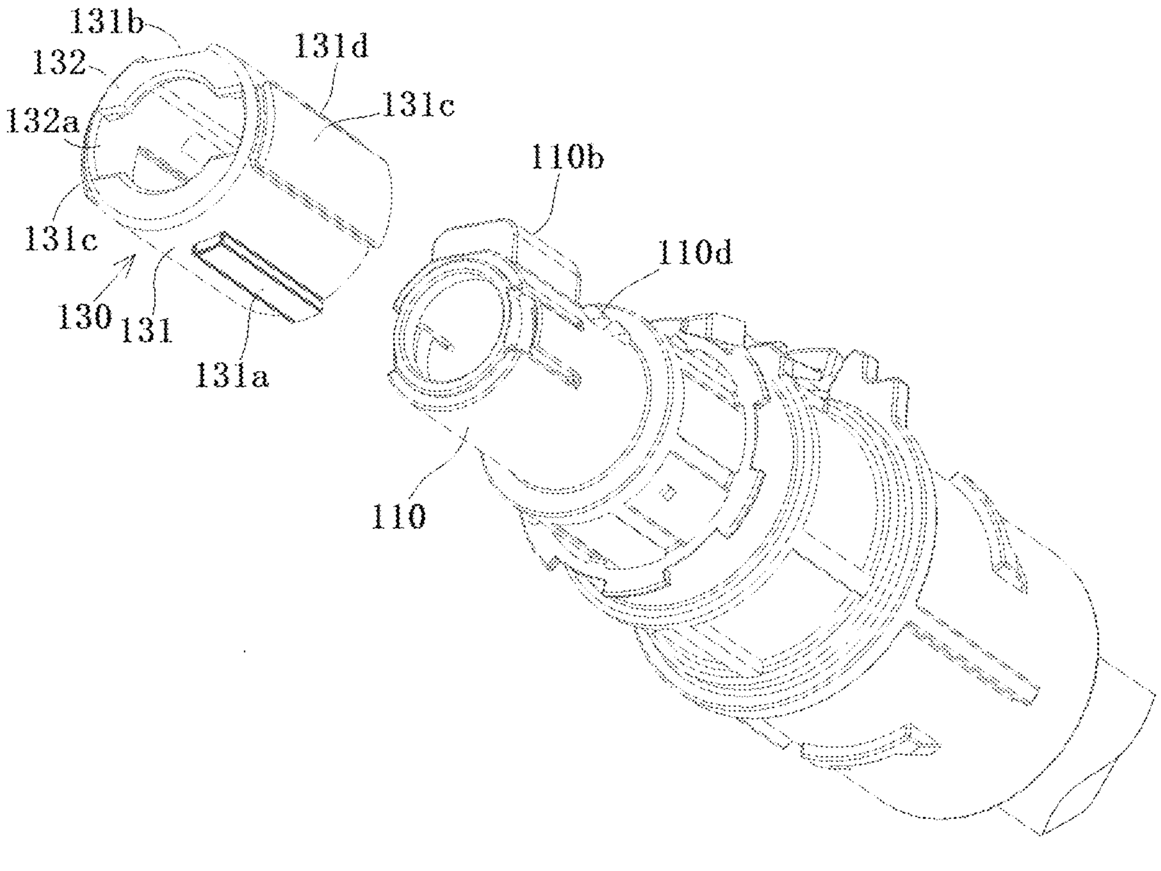
FIG. 2 shows a three-dimensional schematic diagram of a connector according to an exemplary embodiment of the present invention, wherein the terminal position holder is separated from the housing of the connector.
Figure 3:
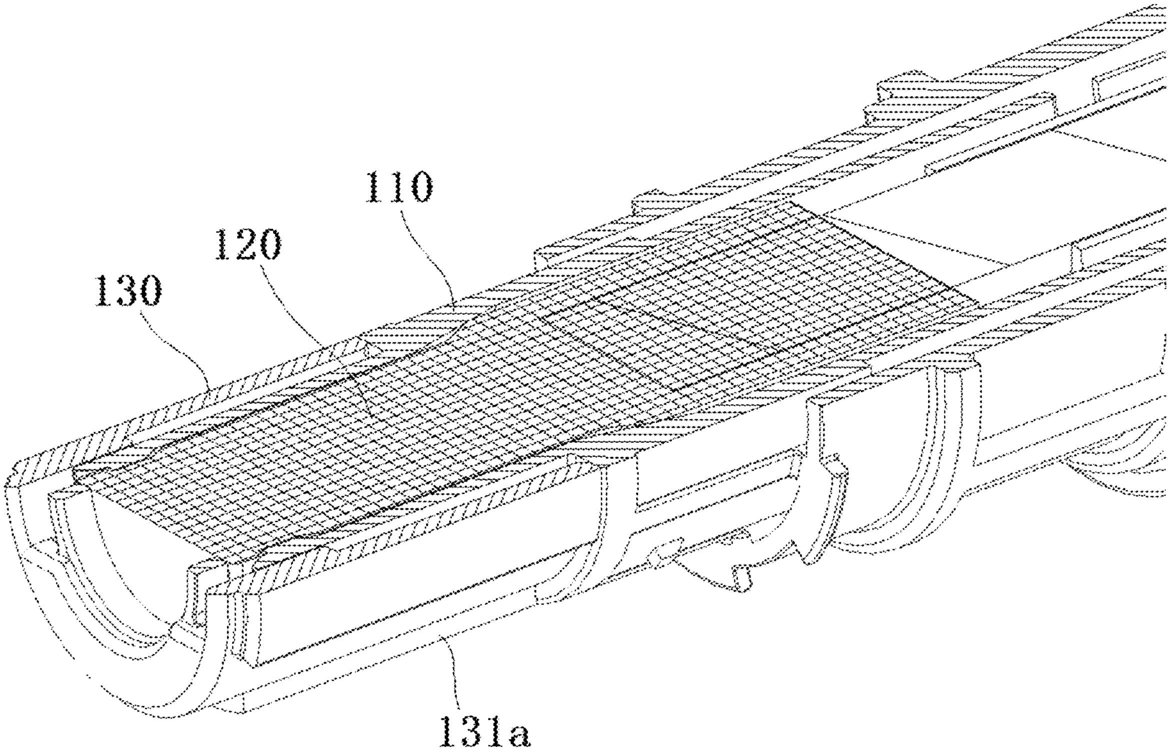
FIG. 3 shows an axial sectional view of the connector shown in FIG. 1.
Figure 4:
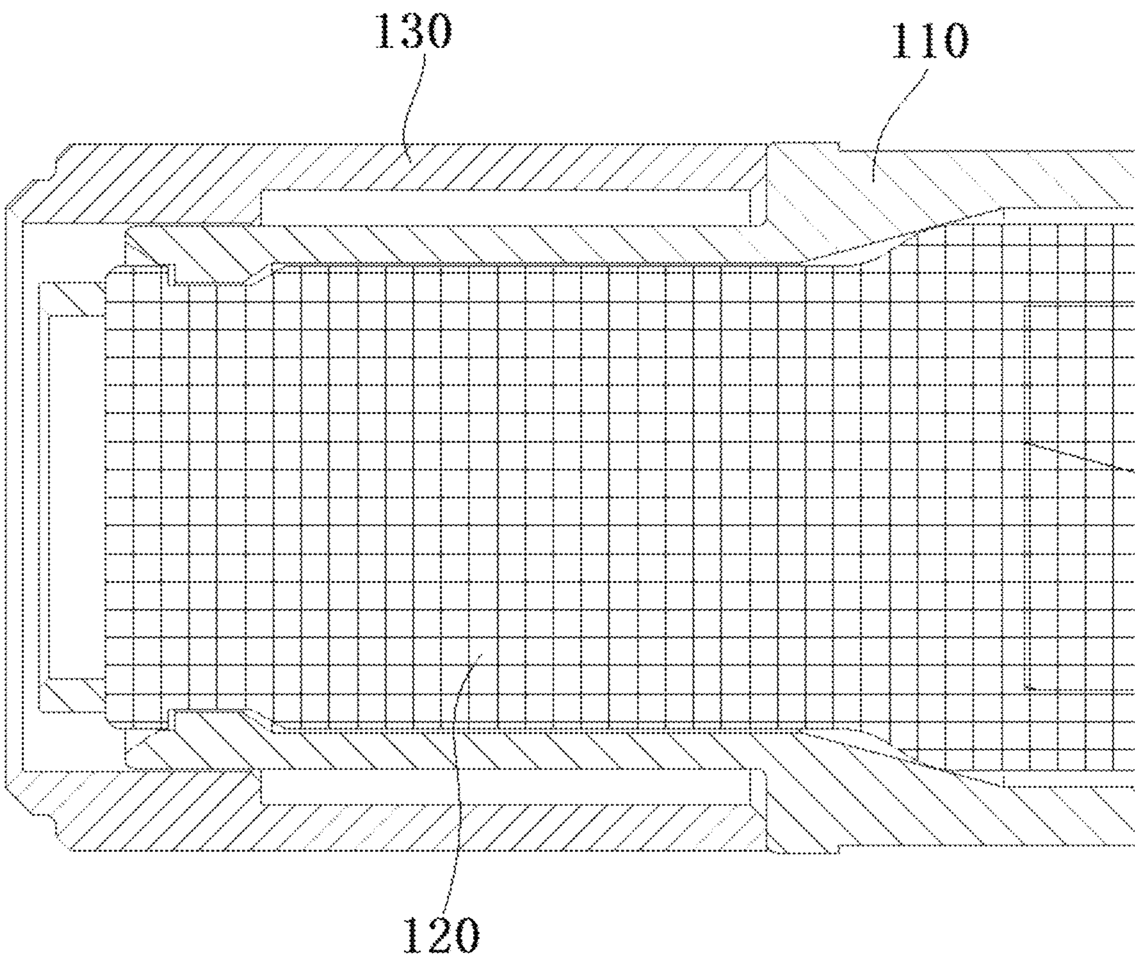
FIG. 4 shows a partial enlarged view of the connector shown in FIG. 3.

FIG. 1 shows a three-dimensional schematic diagram of a connector 10 according to an exemplary embodiment of the present invention, wherein a terminal position holder 130 is sleeved on a housing 110 of the connector 10; FIG. 2 shows a three-dimensional schematic diagram of a connector 10 according to an exemplary embodiment of the present invention, wherein a terminal position holder 130 is separated from a housing 110 of the connector; FIG. 3 shows an axial sectional view of the connector 10 shown in FIG. 1; FIG. 4 shows a partial enlarged view of the connector 10 shown in FIG. 3.

As shown in FIGS. 1 to 4, in the illustrated embodiment, the connector 10 mainly includes a housing 110 and a terminal 120. The terminal 120 is provided in the housing 110. The connector 10 is suitable for mating with a corresponding mating connector 20, for example, with a mating connector 20 having a corresponding identification feature. That is, the connector 10 can only be matched with the corresponding mating connector 20 with the corresponding identification feature, and cannot be matched with a mating connector 20 with mismatched identification feature. In this way, for example, it can prevent the electrical equipment from being connected to the mismatched cable 1.

As shown in FIGS. 1 to 4, in the illustrated embodiment, the connector 10 also includes a terminal position holder 130, which is detachably sleeved on the end of the housing 110.

As shown in FIGS. 1 to 4, in the illustrated embodiment, a mating feature (or referred as an identification feature) 131*a* that can only mate with the corresponding mating connector 20 is formed on the terminal position holder 130 of the connector 10, so that the connector 10 can only mate with the corresponding mating connector 20. In the illustrated embodiment, when the identification feature on the connector 10 needs to be changed, only the terminal position holder 130 needs to be replaced without replacing the housing 110 of the connector 10. Therefore, the cost is reduced and the use is very convenient.

In an exemplary embodiment of the invention, the connector 10 may comprise a plurality of connectors 10 with different identification features. For example, at least one of the shape, size, number and position of the mating features 131*a* of the plurality of connectors 10 is different. In this way, the plurality of connectors 10 can be identified and distinguished by the mating features 131*a* formed on them.

In an exemplary embodiment of the present invention, other structural features of the plurality of connectors 10 are exactly the same except for the mating features 131*a*. In this way, the manufacturing cost of the connectors 10 can be reduced.

In an exemplary embodiment of the present invention, other parts of the plurality of connectors 10 are all identical except for the terminal position holder 130, so that other parts of the plurality of connectors 10 can be interchangeable. In this way, not only the manufacturing cost of the plurality of connectors 10 can be reduced, but also the universality between the plurality of connectors 10 can be improved.

As shown in FIGS. 1 to 4, in the illustrated embodiment, the terminal position holder 130 is cylindrical. The terminal position holder 130 includes a cylindrical wall 131 and an outer end wall 132 located at the outer end of the cylindrical wall 131. A positioning notch 131*b* is formed on the cylindrical wall 131, and the housing 110 is formed with a protrusion package 110*b* for installing a first detection connector (not shown), the protrusion package 110*b* is positioned in the positioning notch 131*b*.

As shown in FIGS. 1 to 4, in the illustrated embodiment, the first detection connector installed on the protrusion package 110*b* is used to match with a second detection connector (not shown) installed on the mating connector 20. The first detection connector and the second detection connector are used to prevent hot plugging of the connector 10 and the mating connector 20 to avoid arc. The mating process of connector 10 and mating connector 20 will be briefly described below.

In the process of inserting the connector 10 into the mating connector 20, the first detection connector and the second detection connector are electrically connected together after the terminals 120 and 220 of the connector 10 and the mating connector 20 are in electrical contact, so as to connect a detection circuit (not shown). After the detection circuit is connected, a control device (not shown) turns on the power supply connected to the cable 1, so that the live plug-in of the connector 10 and the mating connector 20 can be avoided, so that no arc will be generated.

In addition, in the process of pulling out the connector 10 from the mating connector 20, the first detection connector and the second detection connector have been electrically separated before the terminals 120 and 220 of the connector 10 and the mating connector 20 are electrically separated, so as to disconnect the detection circuit in advance. After the detection circuit is disconnected, the control device immediately turns off the power supply connected to the cable 1, so as to ensure that the connector 10 and mating connector 20 are separated without electricity and arc.

As shown in FIGS. 1 to 4, in the illustrated embodiment, the mating feature 131*a* on the connector 10 is a strip-shaped mating protrusion formed on the outer surface of a bottom area of the cylindrical wall 131, and the bottom area of the cylindrical wall 131 is opposite to the protrusion package 110*b* in a radial direction of the cylindrical wall 131. As shown in FIGS. 1 to 4, in the illustrated embodiment, an arc-shaped positioning protrusion 131*c* is respectively formed on the outer surfaces of both sides in the horizontal direction of the cylindrical wall 131, and the two arc-shaped positioning protrusions 131*c* are opposite to each other in a radial direction of the cylindrical wall 131. In this way, when the connector 10 is inserted into the mating connector 20, the outer peripheral surfaces of the arc-shaped positioning protrusion 131*c*, the mating protrusion and the protrusion package 110*b* are in contact with the inner wall surface of an outer housing 210 of the mating connector 20 to position the connector 10.

As shown in FIGS. 1 to 4, in the illustrated embodiment, at least one opening 131*d* is formed on the cylindrical wall 131 of the terminal position holder 130, and a protrusion 110*d* suitable for elastic snap into the opening 131*d* is formed on the housing 110 of the connector 10. In this way, the terminal position holder 130 can be held on the housing 110 of the connector 10.

As shown in FIGS. 1 to 4, in the illustrated embodiment, when the terminal position holder 130 is sleeved on the housing 110 of the connector 10, the outer end wall 132 of the terminal position holder 130 rests against the end face of the housing 110 of the connector 10.

As shown in FIGS. 1 to 4, in the illustrated embodiment, a positioning slot 132*a* is formed on the outer end wall 132 of the terminal position holder 130 for mating with a positioning convex structure 220*a* (see FIG. 6) formed on the terminal 220 of the mating connector 20. When the connector 10 and the mating connector 20 are matched together, the positioning convex structure 220*a* on the terminal 220 is inserted into the positioning slot 132*a* on the terminal position holder 130 to position the terminal 220. As shown in FIG. 2, the outer end wall 132 of the terminal position holder 130 is provided with a terminal through hole that allows the terminal 220 of the mating connector 20 to be inserted. The positioning slot 132*a* on the outer end wall 132 of the terminal position holder 130 is communicated with the terminal through hole.

Embodiment of Mating Connector

Figure 6:
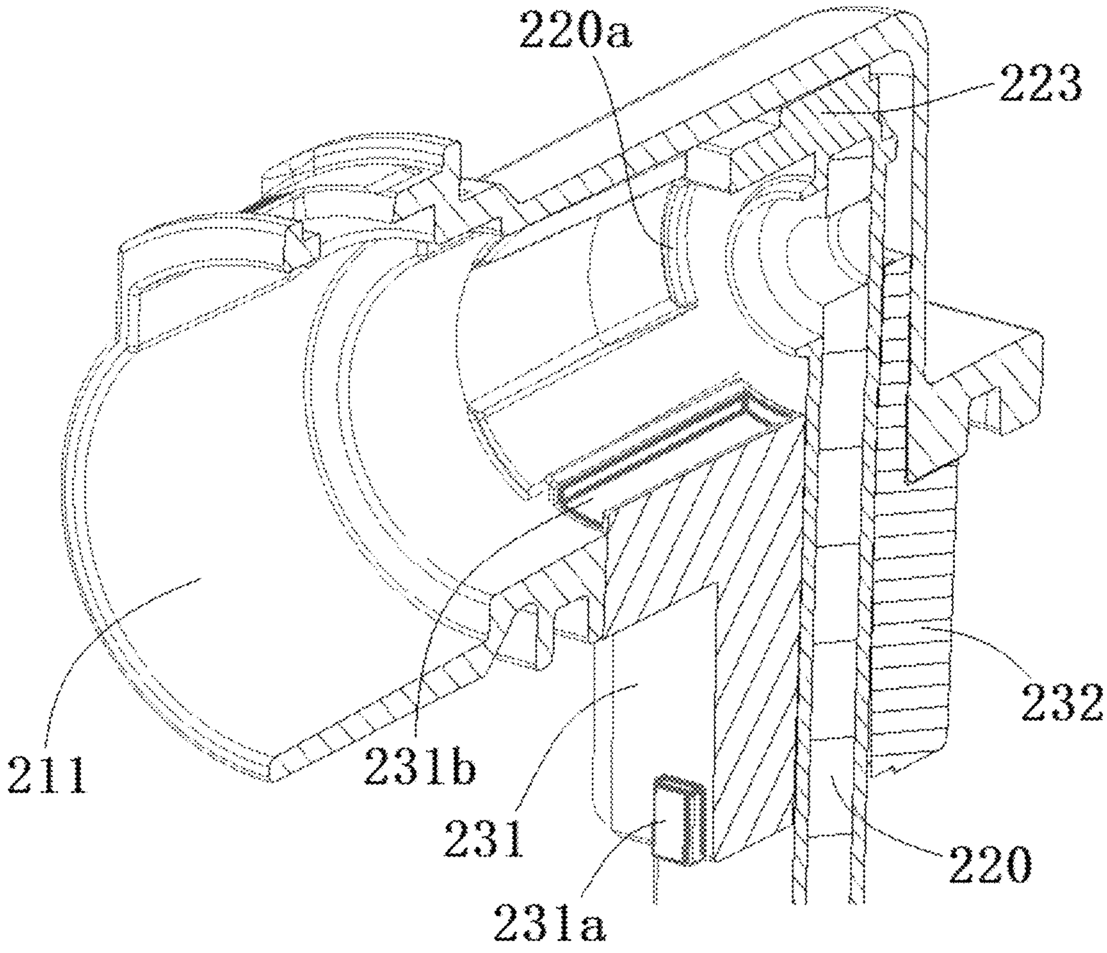
FIG. 6 shows a sectional view of a mating connector according to an exemplary embodiment of the present invention.

FIG. 5 shows a three-dimensional schematic diagram of a mating connector 20 according to an exemplary embodiment of the present invention; FIG. 6 shows a sectional view of a mating connector 20 according to an exemplary embodiment of the present invention; and FIG. 7 shows a three-dimensional schematic diagram of the first half housing 231 in FIGS. 5 and 6.

Figure 7:
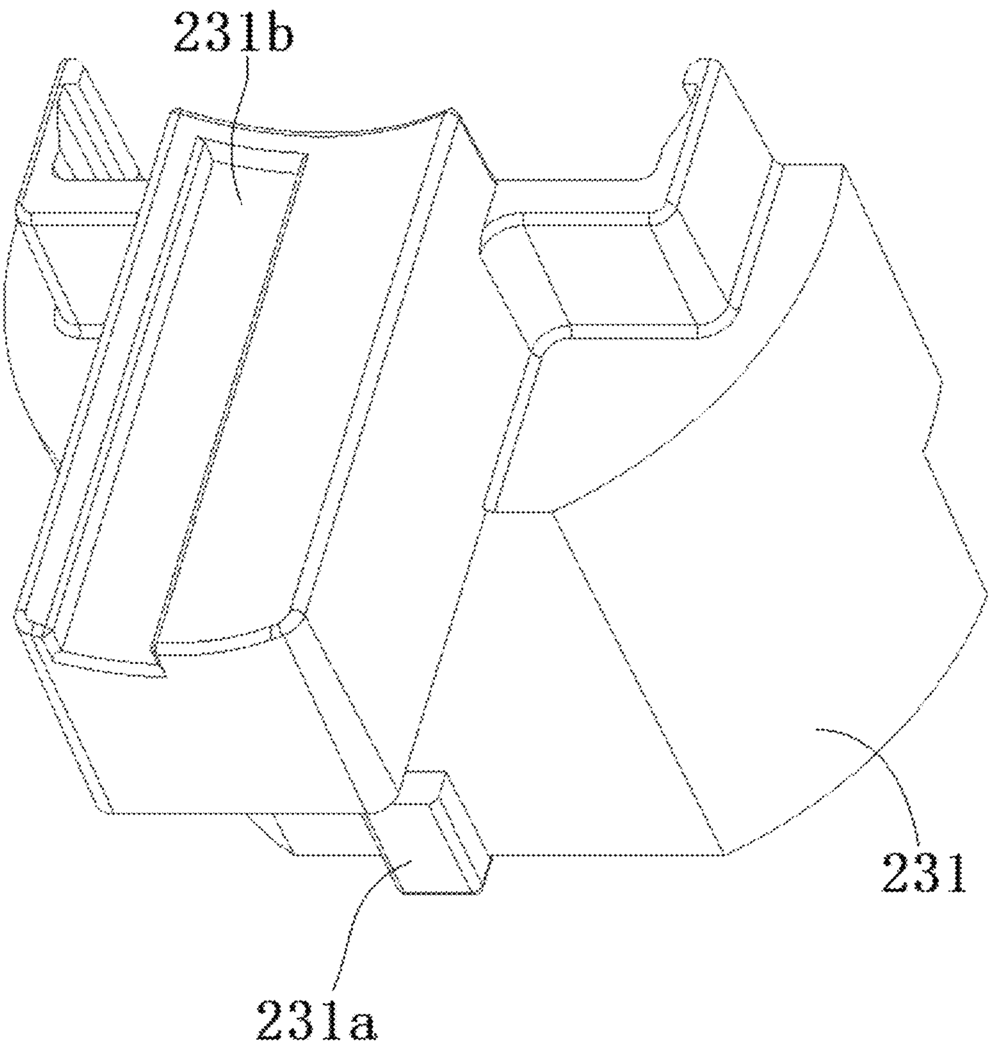
FIG. 7 shows a three-dimensional schematic diagram of the first half housing in FIGS. 5 and 6.

As shown in FIGS. 5 to 7, in the illustrated embodiment, the mating connector 20 mainly includes an outer housing 210, a terminal 220 and an inner housing 230. The terminal 220 is provided in the outer housing 210. The inner housing 230 is detachably mounted in the outer housing 210 for holding the terminal 220 in the outer housing 210.

As shown in FIGS. 5 to 7, in the illustrated embodiment, the mating connector 20 is suitable for mounting on corresponding electrical equipment and mating with the corresponding connector 10. In other words, the mating connector 20 can only be installed on a electrical equipment with a corresponding identification feature and can only be matched with a connector 10 with a corresponding identification feature, but cannot be installed on a electrical equipment with a mismatched identification feature and cannot be matched with a connector with a mismatched identification feature. In this way, it can prevent the electrical equipment from being connected to a mismatched cable 1.

As shown in FIGS. 5 to 7, in the illustrated embodiment, a first mating feature (or referred as a first identification feature) 231*a* that can only mate with the corresponding electrical equipment and a second mating feature (or referred as a second identification feature) 231*b* that can only mate with the corresponding connector 10 are formed on the inner housing 230. The mating connector 20 can only be installed on the corresponding electrical equipment and can only be matched with the corresponding connector 10.

As shown in FIGS. 5 to 7, in the illustrated embodiment, the inner housing 230 includes a first half housing 231 and a second half housing 232. The first half housing 231 and the second half housing 232 are assembled together in a detachable manner. Both the first mating feature 231*a* and the second mating feature 231*b* are formed on the first half housing 231. Therefore, in this embodiment, when it is necessary to change the first and second identification features on the mating connector 20, only the first half housing 231 needs to be replaced without replacing the outer housing 210, which reduces the cost and is very convenient to use.

As shown in FIGS. 5 to 7, in the illustrated embodiment, a terminal accommodation slot is formed in the inner housing 230, and the terminal 220 is accommodated and positioned in the terminal accommodation slot. In this way, the terminal 220 can be maintained in the housing 210 through the inner housing 230.

As shown in FIGS. 5 to 7, in the illustrated embodiment, the inner housing 230 includes a first end protruding from the housing 210 and a second end inserted into the housing 210. The first mating feature 231*a* is formed on the outer surface of the first end of the first half housing 231, and the second mating feature 231*b* is formed on the outer surface of the second end of the first half housing 231.

As shown in FIGS. 5 to 7, in an exemplary embodiment of the present invention, the terminal 220 of the mating connector 20 may include a main body part and a first connection end and a second connection end respectively located at both ends of the main body part. The first connection end may be in a horizontal cylindrical shape, one end of the terminal 120 of the connector 10 may be in a cylindrical shape, and the first connection end of the mating connector 20 can be inserted into the terminal 120 of the connector 10. A connection hole is formed on the second connection end of the mating connector 20, so that the terminal 220 of the mating connector 20 can be electrically connected to an electrical connection terminal (not shown) of the electrical equipment through a screw passing through the connection hole.

In an exemplary embodiment of the present invention, the mating connector 20 may also include an insulation helmet (not shown). The insulation helmet can be sleeved on the end of the first connection end of the terminal 220 of the mating connector 20 to prevent human fingers from contacting the first connection end, so as to improve the use safety.

As shown in FIGS. 5 to 7, in the illustrated embodiment, the outer housing 210 of the mating connector 20 is made of a conductive material, which can improve the electromagnetic shielding effect of the mating connector 20. In addition, in the illustrated embodiment, in order to prevent electrical contact between the terminal 220 and the outer housing 210, an insulator 223 is formed on the main part of the terminal 220 to electrically isolate the terminal 220 from the outer housing 210.

As shown in FIGS. 5 to 7, in the illustrated embodiment, a protrusion is formed on the insulator 223, and the second detection connector is installed on the protrusion. Although not shown, a connecting wire (not shown) electrically connected to the detection circuit is also arranged in the insulator 223.

As shown in FIGS. 5 to 7, in the illustrated embodiment, the first mating feature 231*a* on the mating connector 20 may include at least one first mating protrusion extending in a vertical direction. At least one first mating protrusion on the mating connector 20 can only mate with at least one first mating slot (not shown) formed on the corresponding electrical equipment, so that the mating connector 20 can only be installed on the corresponding electrical equipment. In an exemplary embodiment of the invention, the first mating protrusion may be a raised identification key, and the first mating slot may be an identification slot matched with the identification key. In an exemplary embodiment of the invention, the cross-sectional shapes of the first mating protrusion and the first mating slot may be rectangular, trapezoidal or other suitable shapes.

Note that the present invention is not limited to the illustrated embodiment. For example, in another exemplary embodiment of the invention, the first mating feature 231*a* on the mating connector 20 may include at least one first mating slot, and the at least one first mating slot on the mating connector 20 can only mate with at least one first mating protrusion formed on the corresponding electrical equipment, so that the mating connector can only be installed on the corresponding electrical equipment.

As shown in FIGS. 5 to 7, in the illustrated embodiment, the second mating feature 231*b* on the mating connector 20 includes at least one second mating slot extending in the horizontal direction, and the at least one second mating slot on the mating connector 20 can only mate with at least one second mating protrusion formed on the corresponding connector 10. Thus, the mating connector 20 can only be matched with the corresponding connector 10. In an exemplary embodiment of the invention, the second mating protrusion may be a raised identification key, and the second mating slot may be an identification slot matched with the identification key. In an exemplary embodiment of the invention, the cross-sectional shapes of the second mating protrusion and the second mating slot may be rectangular, trapezoidal or other suitable shapes.

Note that the invention is not limited to the illustrated embodiment. For example, in another exemplary embodiment of the invention, the second mating feature 231*b* on the mating connector 20 includes at least one second mating protrusion, and the at least one second mating protrusion on the mating connector 20 can only mate with at least one second mating slot formed on the corresponding connector 10. Thus, the mating connector 20 can only be matched with the corresponding connector 10.

In another exemplary embodiment of the present invention, the mating connector 20 may comprise a plurality of mating connectors 20 with different identification features. For example, at least one of the shape, size, number and position of the first mating features 231*a* on the plurality of mating connectors 20 is different, and at least one of the shape, size, number and position of the second mating feature 231*b* on the plurality of mating connectors 20 is also different. In this way, the plurality of mating connectors 20 can be identified and distinguished by the first mating features 231*a* and the second mating features 231*b* formed on them.

In another exemplary embodiment of the present invention, other structural features of the plurality of mating connectors 20 are identical except for the first mating features 231*a* and the second mating features 231*b*. In this way, the manufacturing cost of the plurality of mating connectors 20 can be reduced.

In another exemplary embodiment of the present invention, other parts of the plurality of mating connectors 20 are identical except for the first half housing 231, so that other parts of the plurality of mating connectors 20 may be interchangeable. In this way, not only the manufacturing cost of the plurality of mating connectors 20 can be reduced, but also the universality between the plurality of mating connectors 20 can be improved.

As shown in FIGS. 5 to 7, in the illustrated embodiment, the outer housing 210 of the mating connector 20 has a horizontal insertion port 211 at one end and a vertical insertion port at the bottom of the other end, the connector 10 is horizontally inserted into the housing 210 of the mating connector 20 through the horizontal insertion port 211, and the inner housing 230 is vertically inserted into the housing 210 of the mating connector 20 through the vertical insertion port.

As shown in FIGS. 5 to 7, in the illustrated embodiment, the inner wall of the outer housing 210 is provided with a first blocking structure (not shown). The terminal 220 is provided with a second blocking structure (not shown) matched with the first blocking structure 210*a* to prevent the terminal 220 from being pulled out of the outer housing 210. In an exemplary embodiment of the invention, the first blocking structure and the second blocking structure may be a plug-in structure, a snap structure or other suitable structure. In this way, the terminal 220 can be prevented from being pulled out of the outer housing 210.

As shown in FIGS. 5 to 7, in an exemplary embodiment of the present invention, a ring of positioning groove may be formed on the bottom surface of the other end of the outer housing 210 of the mating connector 20, and an elastic sealing ring (not shown) may be provided in the positioning groove. When the housing 210 of the mating connector 20 is installed on the electrical equipment, the elastic sealing ring is compressed between the mating connector 20 and the electrical equipment to realize the sealing between them.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing; and a terminal position holder detachably mounted on an end of the housing, wherein a mating feature adapted to mate with a corresponding mating connector is formed on the terminal position holder, so that the connector is adapted to mate with the corresponding mating connector;

wherein the terminal position holder has a positioning notch formed on a cylindrical wall, the housing has a protrusion package for installing a first detection connector, and the protrusion package is positioned in the positioning notch;

wherein the mating feature is a mating protrusion projecting radially outward from an outer surface of the cylindrical wall, and an area where the mating protrusion is located is opposite to the positioning notch in a radial direction of the cylindrical wall;

wherein an arc-shaped positioning protrusion is respectively formed on the outer surface of both sides in the horizontal direction of the cylindrical wall, and the arc-shaped positioning protrusions are opposite to each other in the radial direction of the cylindrical wall;

wherein outer peripheral surfaces of the arc positioning protrusion, the mating feature and the protrusion package are adapted to contact an inner wall surface of an outer housing of the mating connector to position the connector.

2. The connector according to claim 1, wherein the connector comprises a plurality of connectors, at least one of the shape, size, number and position of the mating features of the plurality of connectors is different.

3. The connector according to claim 2, wherein except for the mating feature, other features of the plurality of connectors are exactly the same.

4. The connector according to claim 2, wherein except for the terminal position holder, other parts of the plurality of connectors are identical and interchangeable.

5. The connector according to claim 1, wherein the terminal position holder is cylindrical and includes the cylindrical wall and an outer end wall at the outer end of the cylindrical wall;

wherein the outer end wall is formed with a terminal through hole to allow a terminal of the mating connector to be inserted.

6. The connector according to claim 5, wherein a positioning slot is formed on the outside of the outer end wall of the terminal position holder to mate with a positioning convex structure formed on the terminal of the mating connector.

7. The connector according to claim 6, wherein the positioning slot is communicated with the terminal through hole formed on the outer end wall of the terminal position holder.

8. The connector according to claim 1, further comprising:

a terminal fixedly installed in the housing.

9. A connector, comprising:

a housing; and a terminal position holder detachably mounted on an end of the housing, wherein a mating feature adapted to mate with a corresponding mating connector is formed on the terminal position holder, so that the connector is adapted to mate with the corresponding mating connector;

wherein at least one opening is formed on a cylindrical wall of the terminal position holder, and a protrusion adapted to be snapped into the opening formed on the housing of the connector;

wherein the terminal position holder is cylindrical and includes a cylindrical wall and an outer end wall at an outer end of the cylindrical wall;

wherein the outer end wall is formed with a terminal through hole to allow a terminal of the mating connector to be inserted;

wherein an arc-shaped positioning protrusion is formed on the outer surface in the horizontal direction of the cylindrical wall;

wherein an outer peripheral surfaces of the arc positioning protrusion, the mating feature and the protrusion are adapted to contact an inner wall surface of an outer housing of the mating connector to position the connector.

10. A connector, comprising:

a housing; and a terminal position holder detachably mounted on an end of the housing;

wherein a mating feature adapted to mate with a corresponding mating connector is formed on the terminal position holder, so that the connector is adapted to mate with the corresponding mating connector;

wherein when the terminal position holder is mounted on the housing of the connector, an outer end wall of the terminal position holder rests against an end face of the housing of the connector;

wherein the terminal position holder is cylindrical and includes a cylindrical wall and the outer end wall;

wherein the outer end wall is formed with a terminal through hole to allow a terminal of the mating connector to be inserted;

wherein an arc-shaped positioning protrusion is formed on an outer surface of the cylindrical wall in the horizontal direction of the cylindrical wall;

wherein an outer peripheral surface of the arc positioning protrusion and the mating feature are adapted to contact an inner wall surface of an outer housing of the mating connector to position the connector.

11. A connector assembly, comprising:

a connector; and a mating connector mated with the connector;

wherein the connector, comprising:

a housing; and a terminal position holder detachably mounted on an end of the housing, wherein a positioning slot is formed on an outside of an outer end wall of the terminal position holder to mate with a positioning convex structure formed on a terminal of the mating connector;

wherein the terminal position holder is cylindrical and includes a cylindrical wall and the outer end wall at an outer end of the cylindrical wall;

wherein an arc-shaped positioning protrusion is respectively formed on the outer surface of both sides in the horizontal direction of the cylindrical wall, and the arc-shaped positioning protrusions are opposite to each other in the radial direction of the cylindrical wall;

wherein outer peripheral surfaces of the arc positioning protrusion are adapted to contact an inner wall surface of an outer housing of the mating connector to position the connector.

12. The connector assembly according to claim 11, wherein the mating connector comprises an inner housing, the inner housing is provided with a first mating feature adapted to mate with a corresponding electrical equipment.

13. The connector assembly according to claim 12, wherein the inner housing of the mating connector is also provided with a second mating feature adapted to mate with a mating feature of the connector.

* * * * *